(12) United States Patent
Howard

(10) Patent No.: US 7,069,840 B1
(45) Date of Patent: Jul. 4, 2006

(54) APPARATUS AND PROCESS FOR PRESSING AND COOKING FOOD PRODUCT LOGS

(76) Inventor: David Howard, 2403 E. 25 Pl., Tulsa, OK (US) 74114-3215

( * ) Notice: Subject to any disclaimer, the term of this patent is extended or adjusted under 35 U.S.C. 154(b) by 397 days.

(21) Appl. No.: 10/442,743

(22) Filed: May 21, 2003

(51) Int. Cl.
*A22C 7/00* (2006.01)
*B30B 7/02* (2006.01)

(52) U.S. Cl. ............... 99/349; 99/351; 99/353; 100/910; 100/194

(58) Field of Classification Search ........... 99/349, 99/351, 353, 432, 441; 100/194, 910, 265, 100/266; 249/82, 167, 117, 121
See application file for complete search history.

(56) References Cited

U.S. PATENT DOCUMENTS

| | | | | |
|---|---|---|---|---|
| 1,986,115 A | * | 1/1935 | Offenhauser | 99/349 |
| 3,750,563 A | * | 8/1973 | Tonjum | 100/194 |
| 4,891,237 A | * | 1/1990 | Rabotski | 426/513 |
| 5,914,147 A | * | 6/1999 | Elimar et al. | 426/513 |
| 5,921,171 A | * | 7/1999 | Dreano | 99/351 |

OTHER PUBLICATIONS

Unitherm Cook/Chill Specialists Brochure, Unitherm Cook/Chill Specialists Brochure, p. 13, date unknown.
Tower Presses and Moulds, Unitherm Food Systems Leaflet, p. 1, date unknown.

* cited by examiner

*Primary Examiner*—Reginald L. Alexander
(74) *Attorney, Agent, or Firm*—Fellers, Snider, Blankenship, Bailey & Tippens, P.C.; Dennis D. Brown

(57) ABSTRACT

An apparatus and a method for pressing and cooking and/or chilling food product logs. The apparatus and method comprise or use a tower press which has vertically compressible tiers and is positioned and mounted at one location for selectively elevating and lowering the tower press. The apparatus and method further comprise or use a container positioned at the same location such that the tower press can be lowered into the container for cooking and/or chilling the food product logs. The tower press can also be elevated out of the container for loading and removing food product logs from the vertically compressible tiers.

17 Claims, 7 Drawing Sheets

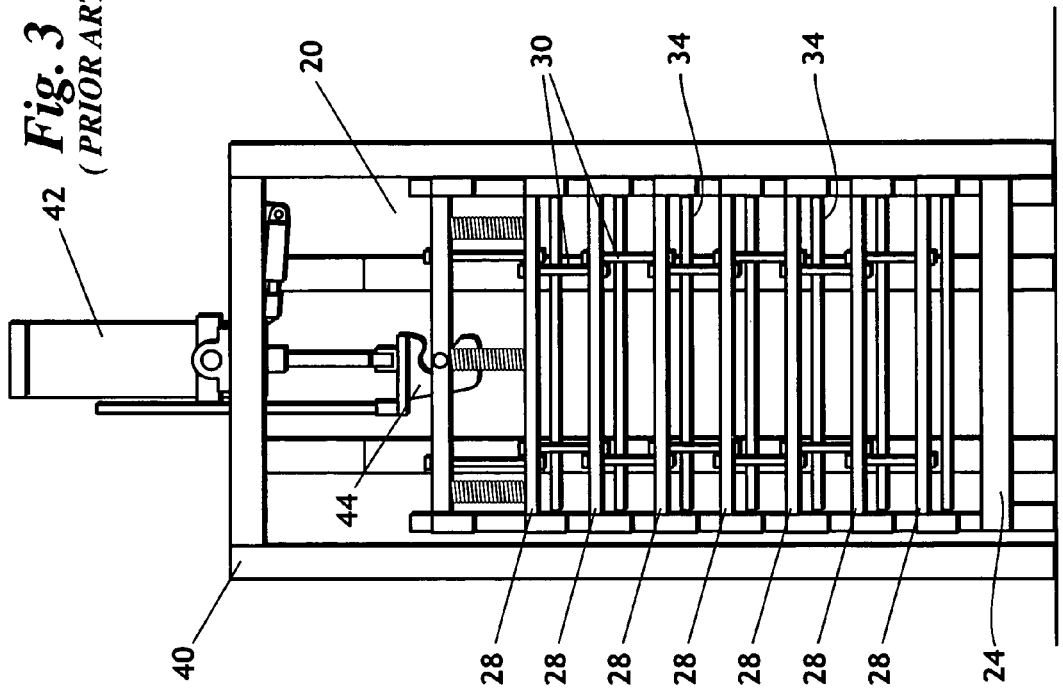
Fig. 3 *(PRIOR ART)*
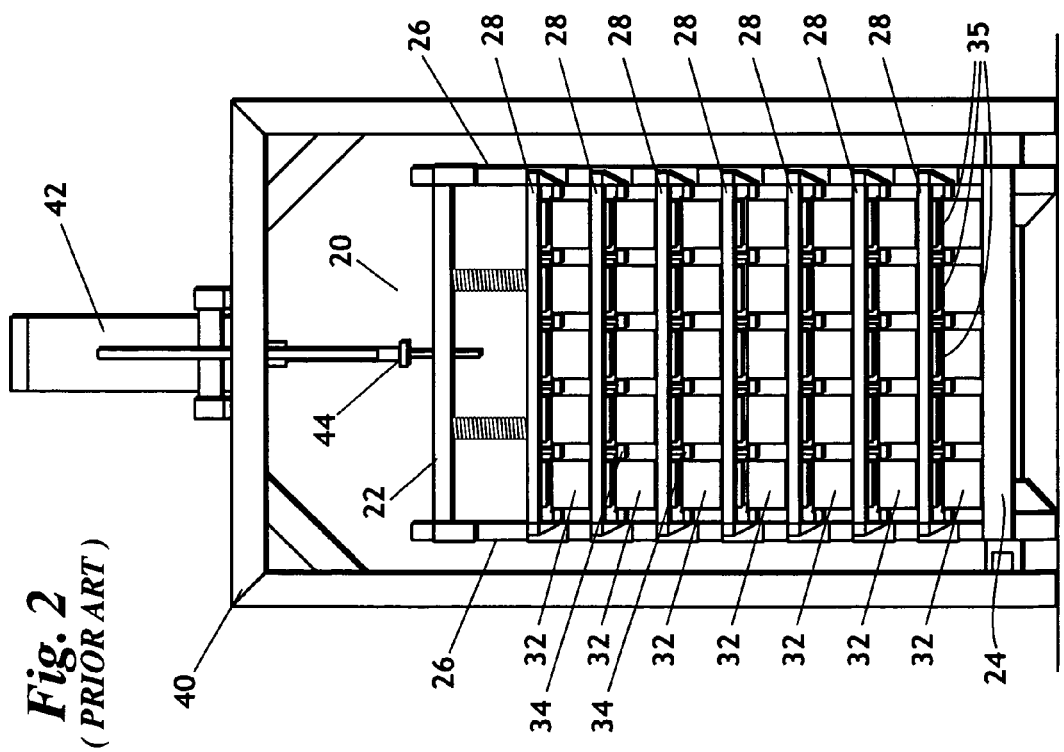
Fig. 2 *(PRIOR ART)*

APPARATUS AND PROCESS FOR PRESSING
AND COOKING FOOD PRODUCT LOGS

FIELD OF THE INVENTION

The present invention relates to processes and apparatuses for pressing and cooking food product logs. More particularly, but not by way of limitation, the present invention relates to the use of tower press apparatuses for pressing and cooking food product logs in place.

BACKGROUND OF THE INVENTION

Multi-tier tower press apparatuses are known in the art for producing emulsified and/or whole muscle ham, turkey, pork, beef, chicken, and other meat log products. Such meat logs are typically about 40 inches, about 48 inches, or about 60 inches in length and typically have substantially rectangular cross sectional shapes of either about 4 inches×4 inches or about 4 inches×6 inches in size.

A tower press 20 of the type heretofore known in the art is depicted in FIGS. 1–3. Tower press 20 comprises: a rectangular box frame 22 having a fixed horizontal bottom frame or other platform structure 24 and vertical corner bars or rods 26; a series of compressible, horizontal frames or other platform structures 28 slidably retained within frame corner bars 26 above bottom 24; and a plurality of platform linkage rods or bars 30 which operably link the slidable platforms 28 together.

Formed between the fixed bottom platform 24 and the slidable platforms 28 of tower press 20 are a series of compression tiers 32, each sized for receiving a row of log molds 2. A typical elongate log mold 2 employed for producing a log product having a substantially rectangular cross section is depicted in FIG. 4. Horizontal positioning bars 34 are secured to the bottoms of slidable platforms 28 for appropriately positioning and spacing the log molds 2 within tiers 32. Each of the slidable platforms 28 also has a corresponding number of elongate mold lid structures 35 secured to and projecting downwardly from the bottoms of slidable platforms 28. Lid structures 35 are sized and positioned such that, when the tower press tiers 32 are compressed, the lid structures 35 will project into the open tops 4 of the log molds 2 to thereby compress the bagged or cased meat material contained therein.

As will be understood by those skilled in the art, each of the platform linkage rods 30 is typically connected between an adjacent pair of slidable platforms 28 in a manner effective for (a) allowing the platforms 28 to be urged downwardly in a compressive manner such that the space between the platforms 28 is reduced and (b) allowing the slidable platforms to be pulled upwardly to noncompressed positions wherein the platforms are spaced a sufficient distance apart to allow the log molds 2 to be received in and removed from the compression tiers 32. To accommodate this movement of the slidable platforms 28 between their compressed and noncompressed positions, the top or bottom end of each platform linkage rod 30 will typically be secured in a fixed manner to one slidable platform 28 and the other end of the linkage rod 30 will be attached to an adjacent platform 28 in a manner allowing sufficient limited sliding movement of the linkage rod 30 through the adjacent tray to permit the two trays to move closer together when urged downward.

In using tower press 20 to produce meat logs, appropriately sized bags or casings filled with emulsified and/or whole muscle meat material are typically placed in the elongate molds 2. The molds 2 are then placed within the multiple stacked tiers 32 of the tower press apparatus 20 and the tiers 32 are compressed vertically together to press the meat material within the molds 2.

In order to compress the slidable platforms 28 of tower press 20, it has heretofore been necessary to transport the tower press 20 to and place the tower press 20 inside a compression frame or similar device 40 of the type depicted in FIGS. 2 and 3. When tower press 20 is positioned within compression frame 40, the slidable platforms 28 thereof can be pushed downward using a pneumatic or hydraulic cylinder 42 and an associated compression and lifting hook 44. Next, a forklift, a pallet truck, or similar device is typically used to remove the compressed tower apparatus from the compression frame and convey the compressed apparatus to a hot water bath, a steam cooker, or other cooking system. Later, when it is time to remove the cooked log products, it has been necessary to carry the tower press 20 back to the compression frame apparatus 40 in order to lift the tower platforms 28 to their noncompressed positions.

As will be apparent, the tower press apparatuses used heretofore have been cumbersome, awkward, and difficult to load, unload, compress, decompress, and carry from station to station. These difficulties and problems can also create significant safety and ergonomic concerns. In addition, the systems used for cooking food product logs pressed within tower press apparatuses have been required to be large walk-in-type units or other systems sized and equipped for delivering and removing the tower presses using forklifts, pallet trucks, or similar devices.

Thus, a need presently exists for a more effective, more efficient, more economical, quicker, more ergonomic, and safer tower press apparatus and method for pressing and cooking meat logs and other food log products. A need particularly exists for a tower press system wherein the tower press loading, unloading, compression, cooking, and decompression operations are conducted at a single location and it is not necessary to transport the apparatus from station-to-station. A need also exists for a tower press apparatus capable of employing less costly, more effective, and more efficient systems for cooking the food log products compressed within the tower. Further, a need exists for an economical, efficient, and effective system for chilling the cooked food product logs without unloading the tower press and without transporting the tower press to another location.

SUMMARY OF THE INVENTION

The present invention provides a tower press system which satisfies the needs and alleviates the problems discussed above. In one aspect, the present invention provides an improved apparatus for pressing food product logs. The apparatus includes a tower press having vertically compressible tiers. The improvement to the apparatus comprises the tower press being positioned and mounted at one location for selectively elevating and lowering the tower press. The improvement further comprises a container positioned at said one location such that (a) the tower press can be lowered into the container for cooking and/or chilling the food product logs and (b) at least a portion of the tower press can be elevated out of the container for loading the food product logs into and removing the food product logs from the vertically compressible tiers.

In another aspect, the present invention provides an improvement for a tower press apparatus having vertically compressible tiers wherein the improvement comprises a frame wherein the tower press is mounted for selectively elevating the tower press to a position spaced above ground and lowering the tower press to a compressed position. The frame preferably includes at least one reciprocatable member which extends when the tower press is elevated and retracts when the tower press is lowered.

In another aspect, the present invention provides an apparatus for pressing and cooking food product logs comprising a plurality of tower press assemblies wherein each of the tower press assemblies comprises: a frame; a tower press having vertically compressible tiers, the tower press being mounted in the frame for selectively elevating and lowering the tower press; and a container positioned for receiving the tower press when the tower press is lowered in the frame. Each of the tower press assemblies preferably operates in (a) a first cycle wherein at least a portion of the tower press is elevated in the frame above the container for loading the food product logs into the vertically compressible tiers followed by (b) a second cycle wherein the tower press is lowered in the frame into the container for cooking the food product logs followed by (c) a third stage wherein at least a portion of the tower press is elevated in the frame above the container for removing the food product logs from the tower press. In this apparatus, it is preferable that at least a portion of the tower press assemblies operate in staggered cycles such that, when at least a first one of the tower press assemblies operates in the first cycle, at least a second one of the tower press assemblies will be operating in the second cycle or third cycle.

In yet another aspect, the present invention provides a process comprising pressing and cooking food product logs in an apparatus comprising a container and a tower press having vertically compressible tiers. The tower press is mounted for selectively elevating the tower press at least partially above the container and lowering the tower press into the container. The process comprises the steps of: (a) elevating at least a portion of the tower press above the container; (b) loading the food product logs into the vertically compressible tiers; (c) lowering the tower press into a compressed position within the container; (d) cooking the food product logs while the food product logs are compressed in the tower press within the container; (e) elevating at least a portion of the tower press above the container; and then (f) removing the food product logs from the vertically compressible tiers. In step (d) of this process, the food product logs are preferably cooked in the container using heated water. Further, the inventive process can optionally include the step, preferably after step (d) and prior to step (e), of chilling the food product logs while the logs are compressed in the tower. In the chilling step, the food product logs will preferably be chilled by delivering brine into the container.

Further aspects, features, and advantages of the present invention will be apparent to those skilled in the art upon examining the accompanying drawings and upon reading the following detailed description of the preferred embodiments.

BRIEF DESCRIPTION OF THE DRAWINGS

FIG. 2 provides an elevational front view of the prior art tower press 20 positioned within a compression frame 40.

FIG. 3 provides an elevational side view of the prior art tower press 20 positioned within compression frame 40.

DETAILED DESCRIPTION OF THE PREFERRED EMBODIMENTS

Figure 4:
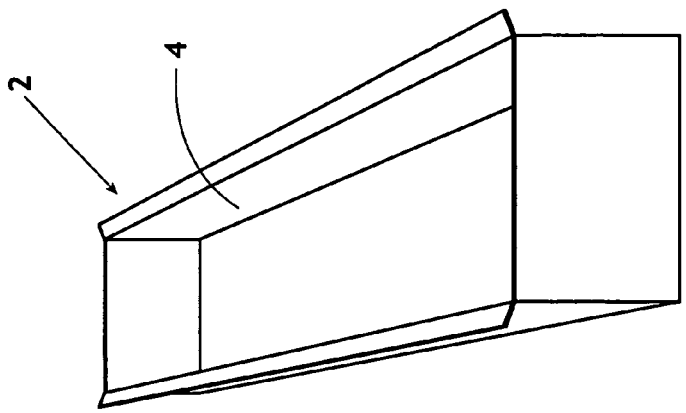
FIG. 4 provides a perspective view of a meat log mold 2.
Figure 1:
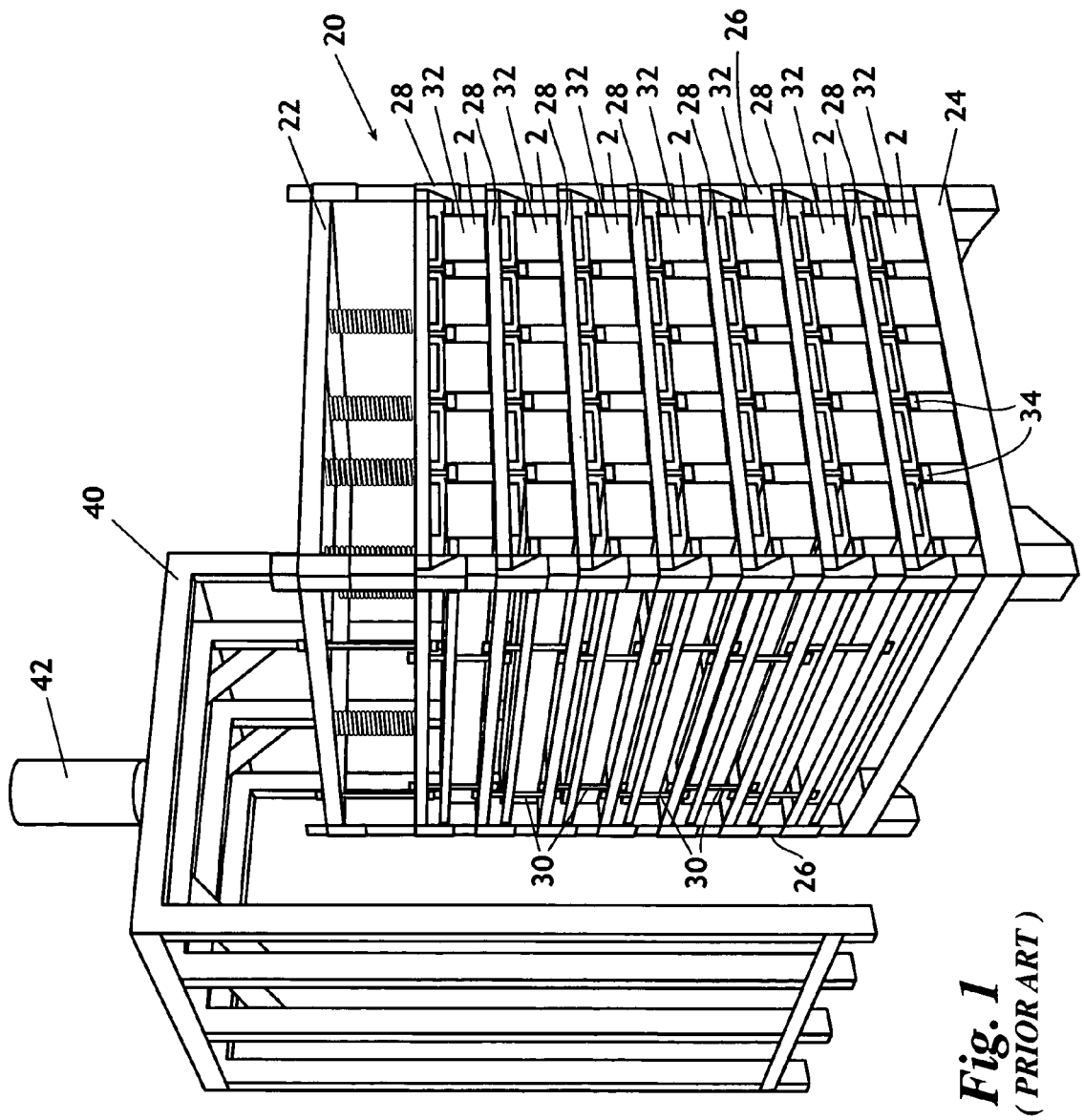
FIG. 1 provides a perspective view of a prior art tower press apparatus 20.

An embodiment 50 of the inventive pressing and cooking apparatus is illustrated in FIGS. 5–8. Inventive apparatus 50 preferably comprises: a tower press assembly 52 including a tower press 54 and a frame 55 for selectively elevating and lowering the tower press 54; a container 56 positioned with frame 55 for receiving the tower press 54 when it is lowered; a feed conveyor 58 for delivering food product logs contained within elongate molds 2 to the loading side 60 of the tower press assembly 52; an elevated worker platform 62 positioned between feed conveyor 58 and the loading side 60 of tower press assembly 52; a product takeaway conveyor 64; and a second elevated worker platform 66 positioned between product takeaway conveyor 64 and the unloading side 68 of tower press assembly 52.

As with the prior art tower press 20 described above, the tower press 54 employed in tower press assembly 52 preferably comprises: a rectangular box frame 72; a horizontal bottom frame or other base structure 74; a plurality of slidable frames or other platform structures 76 slidably retained in box frame 72 above bottom 74; a plurality of platform linkage rods or bars 78 allowing downward compression of the slidable platforms 76; a plurality of compression tiers 80 formed between bottom 74 and slidable platforms 76; horizontal mold spacers 82 secured to and positioned beneath the bottoms of slidable platforms 76; and compression lids 84 secured to and projecting downwardly from the bottoms of slidable platforms 76.

Figure 5:
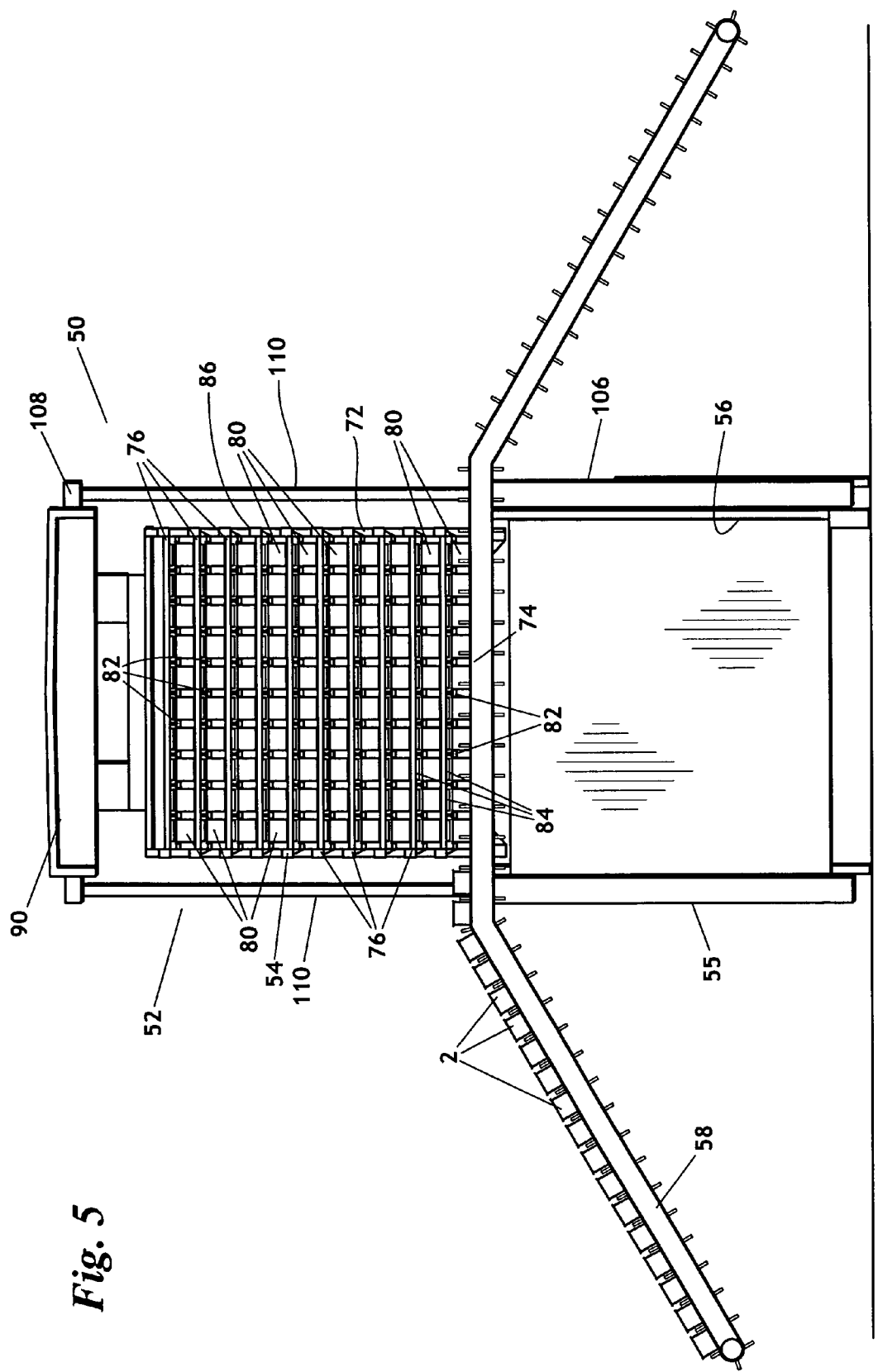
FIG. 5 provides a fully elevated loading side view of an embodiment 50 of the inventive pressing and cooking apparatus.
Figure 6:
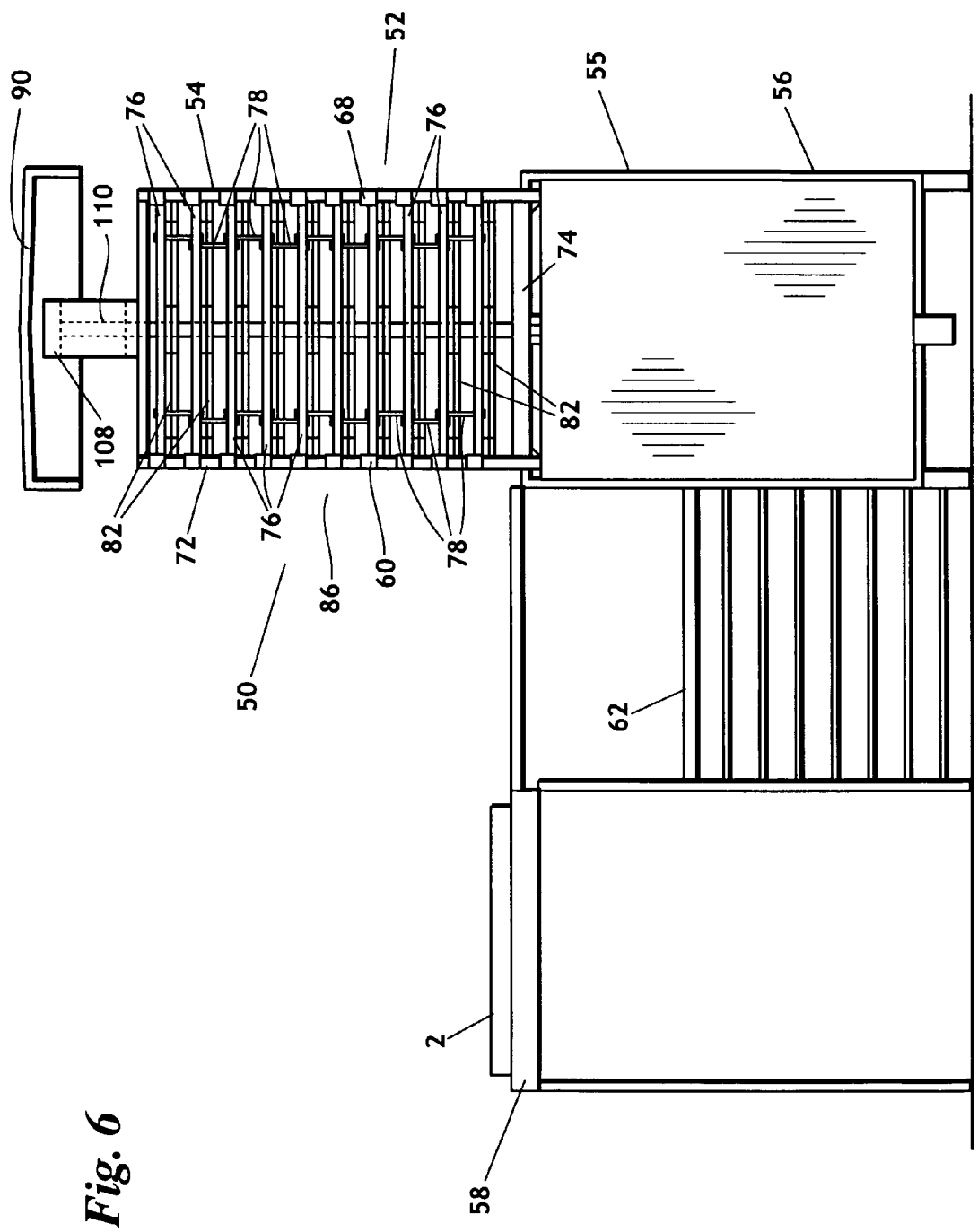
FIG. 6 provides a fully elevated partial forward view of inventive apparatus 50.
Figure 7:
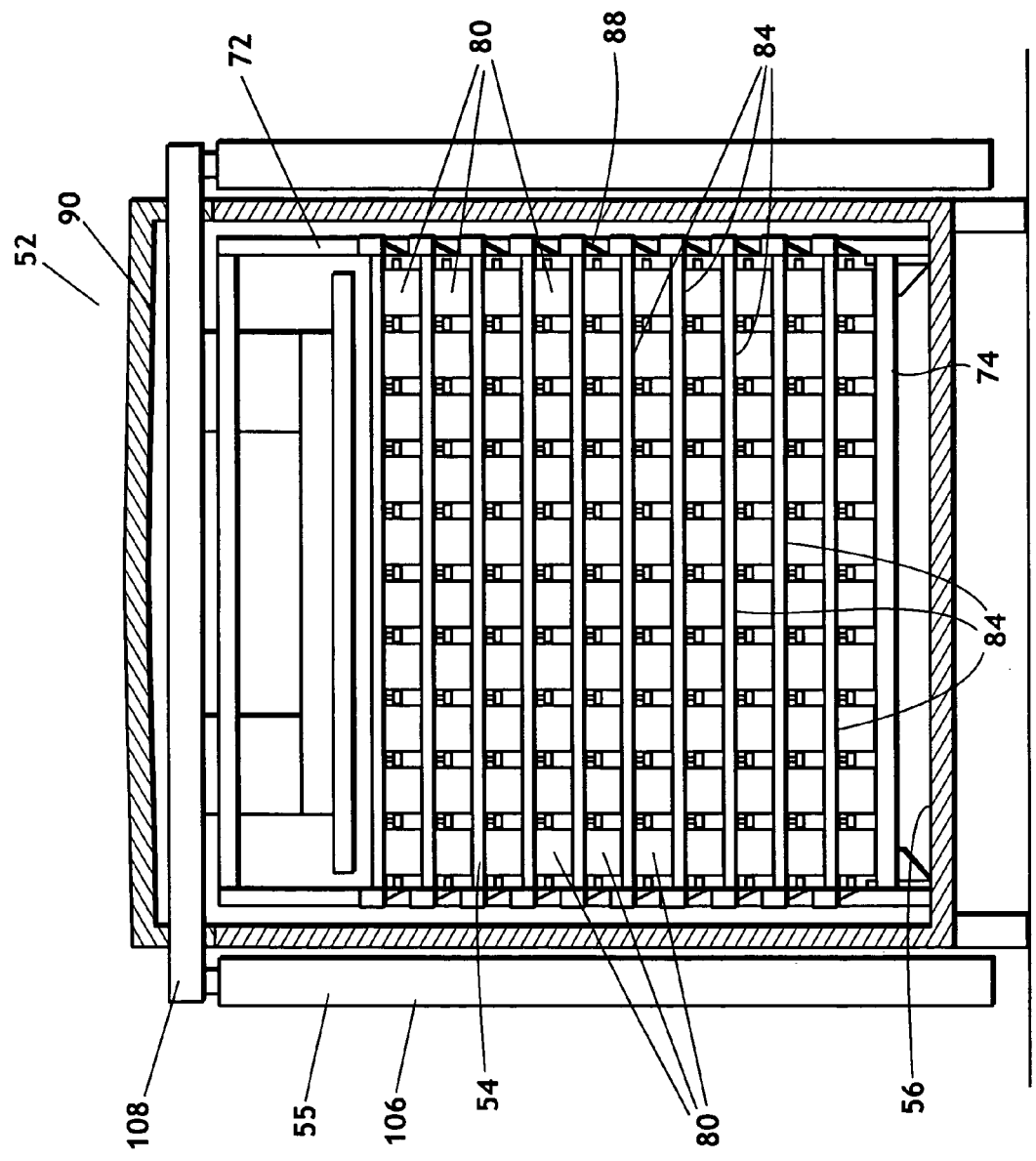
FIG. 7 provides a fully lowered, compressed loading side view of a tower press assembly 52 employed in inventive apparatus 50.
Figure 8:
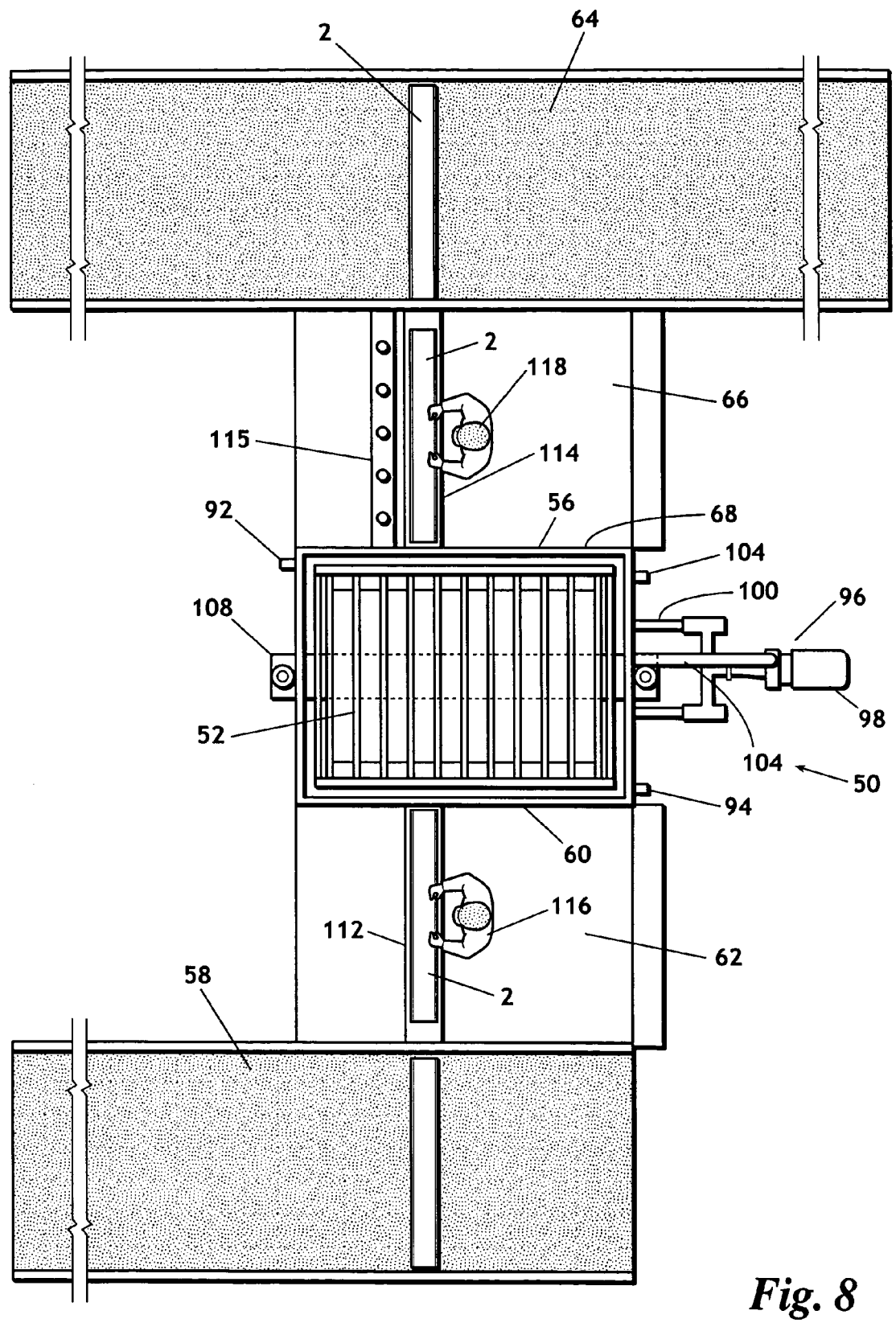
FIG. 8 provides a plan view of inventive apparatus 50.

The tower press assembly 52 and container 56 of inventive apparatus 50 are designed and adapted to allow complete use and operation of tower press 54 at a single location for pressing, cooking, cooling, and/or chilling the food product logs. Tower press 54 is preferably mounted in frame 55 for selectively raising and lowering the tower press 54 between a fully elevated, uncompressed, above-ground position 86 as shown in FIGS. 5 and 6 and a fully lowered, compressed position 88 as shown in FIG. 7. In its fully lowered, compressed position 88, the tower press 54 is preferably completely received within container 56. Tower press assembly 52 also preferably includes a lid 90 which travels up and down with tower press 54 and operates to engage, cover, and close the top of container 56, as shown in FIG. 7, when the tower press 54 is fully received in container 56.

When the tower press 54 is received in container 56 in its fully lowered and compressed position 88, the compressed food product logs held within tower press 54 can be selectively cooked, cooled, and/or chilled by delivering an appropriate cooking medium, cooling medium and/or chilling medium into container 56. Examples of suitable cooking media include, but are not limited to, hot water, steam, and thermal oil. Examples of suitable chilling media include, but are not limited to, cold brine solutions, water, glycol, $CO_2$, and nitrogen.

In one embodiment of the present invention, the compressed food product logs are preferably sequentially cooked, cooled, and chilled by (a) delivering heated water into and circulating the heater water through the container 56, (b) evacuating the heated water, (c) delivering ambient cooling water into container 56, (d) evacuating the cooling water, (e) delivering a cold aqueous brine solution into and circulating the brine solution through container 56 and then (e) evacuating the brine solution. Meat logs processed in accordance with this inventive procedure will preferably be cooked in step (a) to an internal core temperature of at least 155° F. (more preferably at least 160° F. and most preferably 165° F.) and then chilled in step (e) to an internal core temperature not exceeding 45° F. (more preferably not exceeding 40° F. and most preferably not exceeding 39° F.). The intermediate cooling step (c) of the inventive process serves to prevent or significantly reduce the degree of thermal stress or shock which would otherwise be experienced by the food product logs and equipment by going directly from the cooking stage to the chilling stage. During the cooling stage (c), the surface temperature of the cooked log product will most preferably be reduced to a value in the range of from about 120° to about 130° F.

As will understood by those skilled in the art, the container 56 and lid 90 employed in the inventive apparatus will preferably be insulated such that the container 56 will be operable for efficiently and safely cooking the compressed food product logs contained therein with heated water, steam, or other suitable cooking media and/or chilling the food products using brine or other chilling media having temperatures of 10° F. and less. Examples of preferred insulating materials include but are not limited to fiberglass, basalt fiberboard, and ceramic fiber.

Container 56 also preferably includes a fluid inlet 92 (preferably located near the top of container 56) and a fluid outlet 94 (preferably located at the bottom of container 56) for delivering the cooking, cooling, and/or chilling media into and removing such media from the container 56. In addition, container 56 will preferably include a circulation system 96 which is effective for ensuring a constant flow of fluid around the product which produces efficient and even heat transfer. The circulation system 96 preferably comprises a recirculation pump 98 and pump suction and return lines 100 and 104 extending between container 56 and pump 98. A steam inlet 104 is preferably also provided in container 56 for steam injection into the container to maintain constant temperature during cooking.

In the same manner as illustrated hereinbelow for embodiment 200 of the inventive system, the hot water or other cooking medium used in embodiment 50 will preferably be stored and heated in a separate tank. To ensure absolute uniformity and avoid any temperature stratification of the heating medium, the heating medium will preferably be continuously recirculated within the hot water tank and will also preferably be directly heated in the hot water tank using an internal steam injection manifold. The heated water or other cooking media will preferably also be continuously circulated from the storage tank through container 56 during the cooking process.

In like manner, and as also illustrated below in embodiment 200, the inventive system will preferably include a separate cooling media tank for continuously cooling the brine or other cooling medium used in the chilling step and circulating the cooling medium from the storage tank through the cooking and chilling container 56. If an aqueous brine solution is used, the salt concentration thereof will be an amount effective for achieving the desired brine temperature (preferably about 10° F. or less) while maintaining the brine in a liquid state. As will be understood by those skilled in the art, an aqueous brine solution used in the inventive system will typically have a salt concentration in the range of from about 17 to about 20% by volume. To assure absolute uniformity and prevent temperature stratification, the brine solution or other chilling media will preferably be continuously circulated through the storage tank and will also preferably be continuously cooled by indirect heat exchange using an ammonia or Freon refrigerant.

The frame 55 employed in the inventive apparatus for mounting and selectively elevating and lowering the tower press 54 preferably comprises: a lower stationary frame 106 wherein the cooking and/or chilling container 56 is received; an upper horizontal cross piece or other support 108 from which the tower press 54 is suspended and to which the container lid 90 is also secured; and one or more (preferably at least two) vertical reciprocating guide members 110 extending from lower frame 106 to the upper cross piece 108 for guiding the selective raising and lowering of cross piece 108, tower press 54, and lid 90. As will be understood by those skilled in the art, the selective raising and lowering of the tower press 54, cross piece 108, and lid 90 can be accomplished using a pneumatic cylinder, a hydraulic cylinder, an electric screw jack, a chain hoist, or similar device.

For loading raw product into and removing cooked and/or chilled product from the tower press assembly 52, the inventive apparatus 50 preferably further comprises: a raw product transfer table 112 slidably positioned between the product feed conveyor 58 and the loading side 60 of tower press assembly 52; a cooked product transfer table 114 slidably positioned between the product takeaway conveyor 64 and the unloading side 68 of tower press assembly 52; and a slidable overhead vacuum cup device or other apparatus 115 of a type known in the art for removing the cooked food product logs from elongate molds 2 and placing the cooked product logs on the product takeaway conveyor 64.

The tower press 52 will preferably be loaded from bottom to top by first loading the lowermost compression tier 80 thereof and then indexing the tower press 54 downward for successively loading each of the higher compression tiers. During the loading operation, a worker 116 standing on loading platform 62 will move the raw product transfer table 112 as necessary across the width of tower press 54 for sliding the filled product molds 2 from product feed conveyor 58 into the successive horizontal slots of each compression tier 80.

In like manner, after cooking and/or chilling, the tower press 54 will preferably be indexed upwardly from container 56, tier-by-tier, and a worker 118 will move the cooked product transfer table 114 as necessary across the width of tower press 54 for sliding the product molds 2 out of the compression tiers. The product takeaway conveyor 64 will preferably be a two-tiered conveyor of a type known in the art such that the cooked product removed from the product molds 2 will be placed by the vacuum cup assembly or other extraction system 115 onto a first tier for delivery to downstream processing units and the empty product molds 2 will be placed by worker 118 on a second tier for return and reuse.

Figure 9:
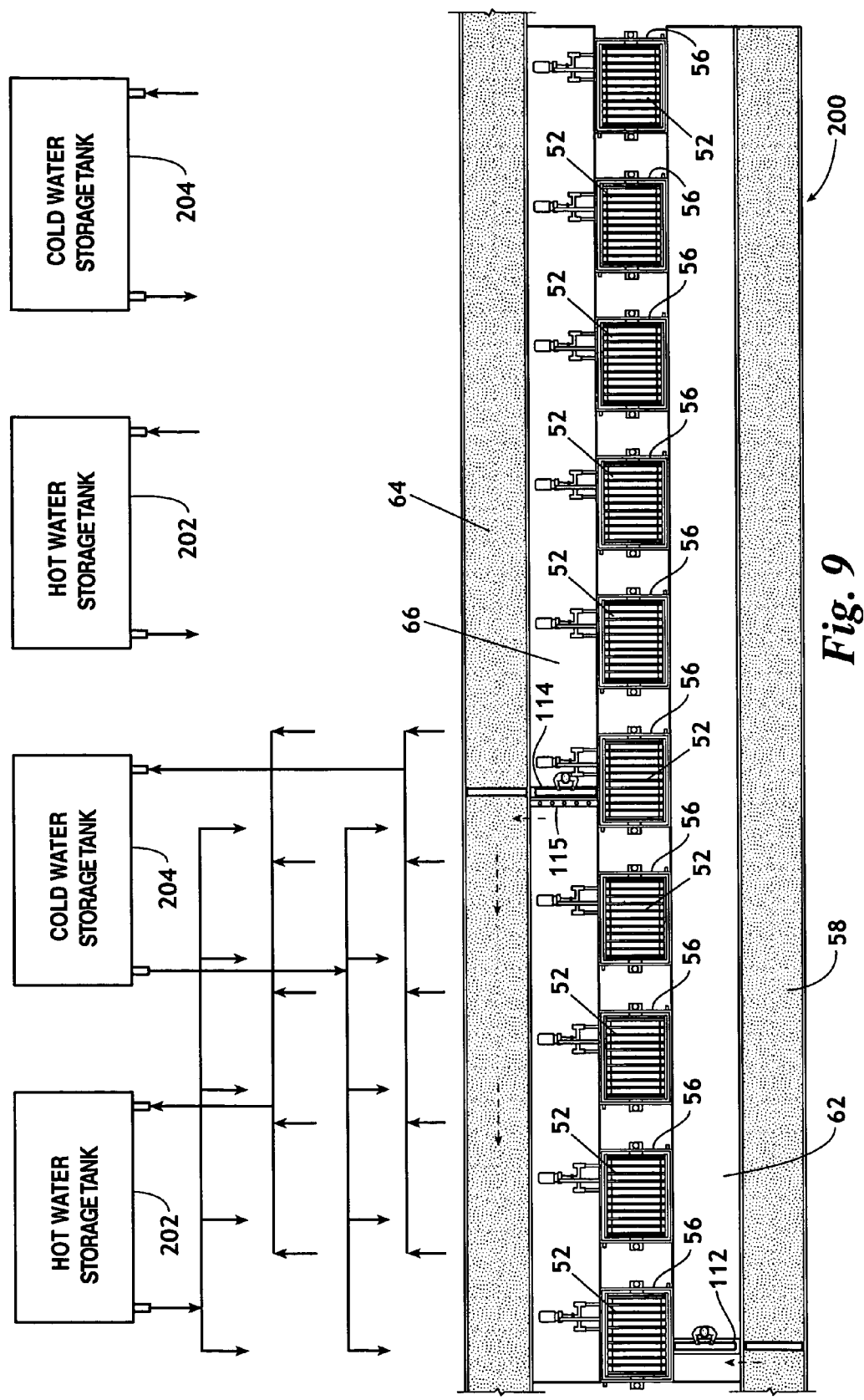
FIG. 9 provides a plan view of a second embodiment 200 of the inventive pressing, cooking, and chilling apparatus.

Another embodiment 200 of the inventive pressing and cooking system is depicted in FIG. 9. Like inventive system 50, the inventive system 200 preferably comprises: a feed conveyor 58, a worker loading platform 62; a two-tiered product takeaway conveyor 64; a worker unloading platform 66; raw and cooked product transfer tables 112 and 114; a vacuum cup assembly or other extraction device 115; one or more heating medium storage tanks 202; and one or more chilling medium storage tanks 204. Inventive system 200 is preferably substantially identical to inventive system 50 except that inventive system 200 preferably includes a plurality of stationary tower press assemblies 52 and associated cooking and/or chilling containers 56.

As in embodiment 50, each of the tower press assemblies 52 in embodiment 200 will preferably be operated in a cyclical manner including (a) a first cycle wherein at least a portion of the tower press 52 is elevated in its frame assembly above the container 56 for loading food product logs into the vertically compressible tiers followed by (b) a second cycle wherein the tower press 54 is lowered into the container 56 for cooking, cooling, and/or chilling the food product logs, followed by (c) a third stage wherein at least a portion of the tower press 54 is elevated above the container 56 for removing the food product logs from the tower 54.

In addition, in order to provide a continuous or semi-continuous flow of cooked and/or chilled product logs to downstream processing units, it is preferable that the plurality of tower press assemblies 52 in embodiment 200 be operated in a staggered manner such that, when at least a first one of the tower press assemblies 52 is operating in the first cycle, at least a second one of the tower press assemblies will be operating in the second or third cycle. Most preferably, the plurality of tower press assemblies 52 will be operated in a staggered fashion such that, when at least a first one of the tower press assemblies 52 is operating in the first cycle, at least a second one of the tower press assemblies will be simultaneously operating in the second cycle and at least a third one of the tower press assemblies will be simultaneously operating in the third cycle.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. In an apparatus for pressing food product logs including a tower press having vertically compressible tiers, the improvement comprising said tower press being positioned and mounted at one location for selectively elevating and lowering said tower press and said improvement further comprising a container positioned at said one location such that:
said tower press can be lowered into said container for cooking said food product logs, chilling said food product logs, or both cooking and chilling said food product logs and
at least a portion of said tower press can be elevated out of said container for loading said food product logs into and removing said food product logs from said vertically compressible tiers,
wherein said food product logs, when received in said vertically compressible tiers, are positioned in product molds and wherein said improvement further comprises a product takeaway conveyor running adjacent said tower press and means for removing said food product logs from said product molds and placing said food product logs on said takeaway conveyor.

2. The apparatus of claim 1 wherein said improvement further comprises a lid which is vertically movable with said tower press such that said lid will cover said container when said tower press is received in said container in a compressed position.

3. The apparatus of claim 1 wherein said improvement further comprises a fine wherein said tower press is mounted for selectively elevating and lowering said tower press.

4. The apparatus of claim 3 wherein the improvement her comprises said frame including at least one reciprocatable member which extends when said tower press is elevated and retracts when said tower press is lowered.

5. The apparatus of claim 4 wherein the improvement further comprises said frame including at least two of said reciprocatable members and said container is positioned between said reciprocatable members.

6. The apparatus of claim 1 wherein the improvement further comprises at least one elevated worker platform adjacent said tower press.

7. The apparatus of claim 1 wherein the improvement further comprises at least one movable product transfer deck mounted adjacent said tower press for loading said food product logs into said vertically compressible tiers, removing said food product logs from said vertically compressible tiers, or both loading said food product logs into and removing said food product logs from said vertically compressible tiers.

8. The apparatus of claim 1 wherein the improvement further comprises said product takeaway conveyor comprising a first tier for receiving and conveying said food product logs and a second tier for receiving and conveying said product molds.

9. The apparatus of claim 1 wherein said improvement further comprises a hot water tank, separate from said container, wherein heated water is produced for cooking said food product logs by delivering said heated water into said container.

10. The apparatus of claim 1 wherein said improvement further comprises a brine tank, separate from said container, wherein cooled brine is produced for chilling said food product logs by delivering said cooled brine into said container.

11. An apparatus for pressing and cooking food product logs comprising a plurality of tower press assemblies and a product takeaway conveyor running adjacent said tower press assemblies, wherein:
each of said tower assemblies comprises
a frame,
a tower press having vertically compressible tiers, said tower press being mounted in said frame for selectively elevating and lowering said tower press, and
a container positioned for receiving said tower press when said tower press is lowered in said frame,
each of said tower press assemblies operates in a first cycle wherein at least a portion of said tower press is elevated in said frame above said container for loading said food product logs into said vertically compressible tiers followed by a second cycle wherein said tower press is lowered in said frame into said container for cooking said food product logs followed by a third cycle wherein at least a portion of said tower press is elevated in said frame above said container for removing said food product logs from said tower press,
when received in said vertically compressible tiers, said food product logs are held in product molds and said product takeaway conveyor comprises a first tier for receiving and conveying said food product logs and a second tier for receiving and conveying said product molds.

12. The apparatus of claim 11 wherein at least a portion of said tower press assemblies operate in staggered cycles such that, when at least a first one of said tower press assemblies operates in said first cycle, at least a second one of said tower press assemblies operates in said second cycle or in said third cycle.

13. The apparatus of claim 11 wherein at least a portion of said tower press assemblies operate in staggered cycles such that, when at least a first one of said tower press assemblies operates in said first cycle, at least a second one of said tower press assemblies operates in said second cycle and at least a third one of said tower press assemblies operates in said third cycle.

14. The apparatus of claim 11 wherein
said apparatus further comprises means for removing said food product logs from said product molds and placing said food product logs on said takeaway conveyor.

15. The apparatus of claim 11 further comprising a hot water tank, separate from said containers, wherein heated water is produced for cooking said food product logs by delivering said heated water into at least one of said containers.

16. The apparatus of claim 11 further comprising a brine tank, separate from said containers, wherein cooled brine is produced for chilling said food product logs by delivering said cooled brine into at least one of said containers.

17. An apparatus for pressing and cooking food product logs comprising a plurality of tower press assemblies and a product takeaway conveyor running adjacent said tower press assemblies, wherein;

each of said tower assemblies comprises
a frame,
a tower press having vertically compressible tiers, said tower press being mounted in said frame for selectively elevating and lowering said tower press, and
a container positioned for receiving said tower press when said tower press is lowered in said frame, each of said tower press assemblies operates in a first cycle wherein at least a portion of said tower press is elevated in said frame above said container for loading said food product logs into said vertically compressible tiers followed by a second cycle wherein said tower press is lowered in said frame into said container for cooking said food product logs followed by a third cycle wherein at least a portion of said tower press is elevated in said frame above said container for removing said food product logs from said tower press, when received in said vertically compressible tiers, said food product logs are held in product molds and said apparatus further comprises means for removing said food product logs from said product molds and placing said food product logs on said takeaway conveyor.

* * * * *

UNITED STATES PATENT AND TRADEMARK OFFICE
CERTIFICATE OF CORRECTION

| | |
|---|---|
| PATENT NO. | : 7,069,840 B1 |
| APPLICATION NO. | : 10/442743 |
| DATED | : July 4, 2006 |
| INVENTOR(S) | : Howard |

It is certified that error appears in the above-identified patent and that said Letters Patent is hereby corrected as shown below:

<u>Column 8,</u>
Line 7, "fine" should be --frame--.
Line 9, "her" should be --further--.

Signed and Sealed this

Twenty-third Day of January, 2007

JON W. DUDAS
*Director of the United States Patent and Trademark Office*